US009208611B2

(12) United States Patent
Seo et al.

(10) Patent No.: US 9,208,611 B2
(45) Date of Patent: Dec. 8, 2015

(54) SYSTEM AND METHOD FOR DISPLAYING 3-DIMENSION MAP USING TEXTURE MAPPING

(75) Inventors: Jung Kak Seo, Seoul (KR); Dae Myung Kim, Seoul (KR)

(73) Assignee: Intellectual Discovery Co., Ltd., Seoul (KR)

( * ) Notice: Subject to any disclaimer, the term of this patent is extended or adjusted under 35 U.S.C. 154(b) by 439 days.

(21) Appl. No.: 12/992,183

(22) PCT Filed: Jun. 29, 2008

(86) PCT No.: PCT/KR2008/003794
§ 371 (c)(1),
(2), (4) Date: Nov. 11, 2010

(87) PCT Pub. No.: WO2009/139518
PCT Pub. Date: Nov. 19, 2009

(65) Prior Publication Data
US 2011/0063290 A1    Mar. 17, 2011

(30) Foreign Application Priority Data

May 14, 2008 (KR) ........................ 10-2008-0044636

(51) Int. Cl.
*G06T 15/04* (2011.01)
*G06T 17/05* (2011.01)
(52) U.S. Cl.
CPC ................. *G06T 17/05* (2013.01); *G06T 15/04* (2013.01)

(58) Field of Classification Search
CPC ....... G06T 15/04; G06T 11/206; G06T 11/00; G06T 17/00; G06T 19/00
USPC ........................................... 345/582
See application file for complete search history.

(56) References Cited

U.S. PATENT DOCUMENTS

| 5,471,572 | A | 11/1995 | Buchner et al. | |
| 5,586,234 | A * | 12/1996 | Sakuraba et al. | 345/582 |
| 6,326,976 | B1 * | 12/2001 | Huettner | 345/587 |
| 2005/0151751 | A1 * | 7/2005 | Hong et al. | 345/582 |
| 2005/0259108 | A1 * | 11/2005 | Chladny | 345/588 |

FOREIGN PATENT DOCUMENTS

| KR | 10-2001-0018635 A | 3/2001 |
| KR | 10-2005-0019833 A | 3/2005 |
| WO | WO-92/10904 A1 | 6/1992 |
| WO | WO-2004/006181 A2 | 1/2004 |

* cited by examiner

*Primary Examiner* — Mark Zimmerman
*Assistant Examiner* — F. M. Hossain
(74) *Attorney, Agent, or Firm* — Fox Rothschild LLP (57) ABSTRACT

A display system and method using texture mapping is provided. The display system, including: a texture maintenance unit maintaining a texture generated based on a characteristic of an object; a texture selection unit selecting a texture based on an object to be displayed; and a texture application unit repeatedly applying the selected texture to at least a portion of a three-dimensional (3D) texture corresponding to the object to be displayed.

16 Claims, 7 Drawing Sheets

SYSTEM AND METHOD FOR DISPLAYING 3-DIMENSION MAP USING TEXTURE MAPPING

CROSS-REFERENCE TO RELATED APPLICATIONS

This application is the U.S. national stage application of International Patent Application No. PCT/KR2008/003794, filed Jun. 29, 2008, which claims priority to Korean Application No. 10-2008-0044636, filed May 14, 2008, the disclosures of each of which are incorporated herein by reference in their entirety.

TECHNICAL FIELD

The present invention relates to a system and method of displaying a three-dimensional (3D) map using texture mapping, and more particularly, to a system and method of displaying a 3D map using texture mapping which may repeatedly apply a texture generated based on a characteristic of an object, and thereby may represent the object variously and efficiently.

BACKGROUND ART

Representing an artificial structure such as a building may enrich a three-dimensional (3D) map. In this instance, modeling an actual object may be an efficient method to represent more realistically. However, since a very large area such as a country or a continent may be generally displayed on a 3D map, it is impossible to model all objects in a corresponding area due to time and costs involved.

Accordingly, a system and method to display objects such as buildings more variously and efficiently are provided.

DISCLOSURE OF INVENTION

Technical Goals

An aspect of the present invention provides a display system and method that may display an external appearance of an object such as a building using texture mapping that repeatedly uses a small texture, and thereby may efficiently reduce a texture storage size and display the object.

An aspect of the present invention also provides a display system and method that may use a small texture generated based on a characteristic of an object, use texture mapping coordinates in integer form, and thereby may represent the object more variously and graphically.

Technical Solutions

According to an aspect of the present invention, there is provided a display system, including: a texture maintenance unit maintaining a texture generated based on a characteristic of an object; a texture selection unit selecting a texture based on an object to be displayed; and a texture application unit repeatedly applying the selected texture to at least a portion of a three-dimensional (3D) texture corresponding to the object to be displayed.

The at least a portion of the 3D texture may include an external surface texture with respect to an external surface of the object to be displayed, and the texture application unit may include: a texture application confirmation unit confirming a number of applications of the selected texture based on length data of the selected texture and the external surface texture; and an application unit connecting the same number of the selected texture as the confirmed number of applications, and applying the connected texture to the external surface texture. Here, the length data includes data of a width and a length.

The texture application confirmation unit may include: a row confirmation unit confirming a number of rows to be applied based on a first ratio of a width of the external surface texture to a width of the selected texture; a column confirmation unit confirming a number of columns to be applied based on a second ratio of a length of the external surface texture to a length of the selected texture; and a confirmation unit confirming the number of applications based on the number of rows and the number of columns. Here, the first ratio and the second ratio may be an integer obtained by truncating decimals.

The application unit may connect the selected texture in matrix form with the number of rows and the number of columns confirmed by the texture application confirmation unit.

The display system may further include a display unit displaying the 3D texture where the selected texture is applied on a map screen.

The object may include an artificial structure to be displayed on a 3D map, and the characteristic of the object may include a characteristic of an external surface of the artificial structure.

The 3D texture may include 3D linear data of the artificial structure, and the texture may represent an external appearance of the artificial structure based on the 3D linear data.

According to another aspect of the present invention, there is provided a display method, including: maintaining a texture generated based on a characteristic of an object; selecting the texture based on an object to be displayed; and repeatedly applying the selected texture to at least a portion of a 3D texture corresponding to the object to be displayed.

Advantageous Effects

A display system and method may display an external appearance of an object such as a building using texture mapping that repeatedly uses a small texture, and thereby may efficiently reduce a texture storage size and may also display the object.

A display system and method may use a small texture generated based on a characteristic of an object, use texture mapping coordinates in integer form, and thereby may represent the object more variously and graphically.

BEST MODE FOR CARRYING OUT THE INVENTION

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 1:
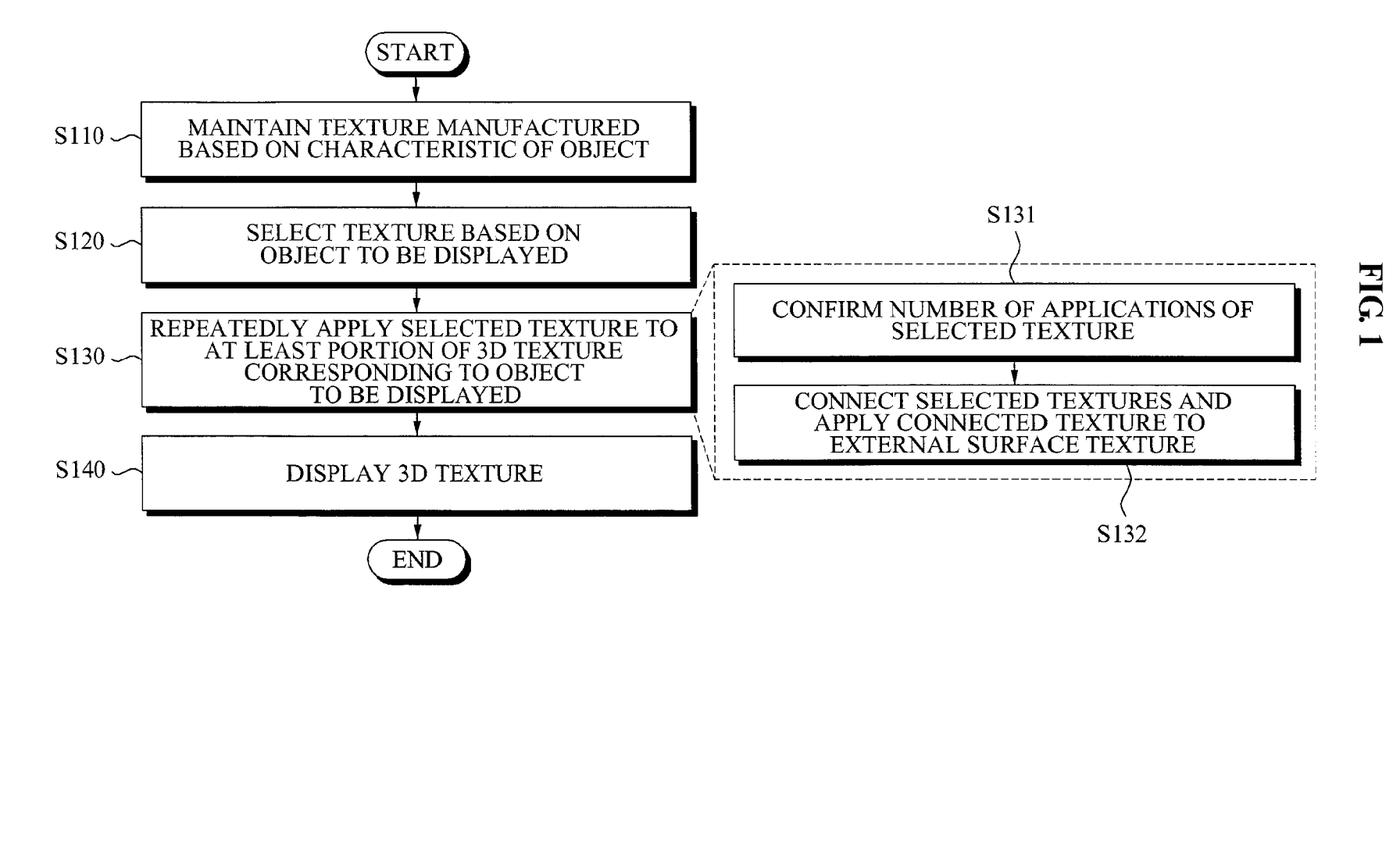
FIG. 1 is a flowchart illustrating a display method according to an embodiment of the present invention.

FIG. 1 is a flowchart illustrating a display method according to an embodiment of the present invention. The display method may be performed by a display system according to an embodiment of the present invention. Referring to FIG. 1, the display method is described in detail.

In operation S110, the display system may maintain a texture generated based on a characteristic of an object. Here, the object may include an artificial structure such as a building to be displayed on a three-dimensional (3D) map. Also, the characteristic of the object may include a characteristic of an external surface of the artificial structure.

In operation S120, the display system may select a texture based on an object to be displayed. That is, the texture which is generated based on the characteristic of the object to be displayed may be selected in operation S120. In this instance, a plurality of textures, as opposed to a single texture, may be selected, which is described in detail below.

In operation S130, the display system may repeatedly apply the selected texture to at least a portion of a 3D texture corresponding to the object to be displayed. The at least a portion of the 3D texture may include an external surface texture with respect to an external surface of the object to be displayed. In this instance, the display system may confirm a number of applications of the selected texture, that is, a number of selected textures to be applied to the external surface texture. For this, the display system may perform confirmation in operation S131 and connecting and applying in operation S132 as illustrated in FIG. 1.

In operation S131, the display system may confirm the number of applications of the selected texture based on length data of the selected texture and the external surface texture. In this instance, the length data may include data of a width and a length. The number of applications may be confirmed using a number of rows based on the width, and a number of columns based on the length. An operation of confirming the number of applications is described in greater detail with reference to FIG. 2.

In operation S132, the display system may connect the same number of the selected texture as the confirmed number of applications, and apply the connected texture to the external surface texture. For example, the 3D texture may include 3D linear data of the artificial structure, and the texture may represent an external appearance of the artificial structure based on the 3D linear data. That is, the display system may confirm the number of applications, that is, a number of small textures applied to the 3D linear data of the artificial structure. Also, the display system may connect the same number of the selected texture as the confirmed number of applications, and thereby may represent the external appearance of the artificial structure such as a building. For this, the display system may connect the selected texture in matrix form with the number of rows and the number of columns confirmed in operation S131, and apply the connected texture to the external surface texture.

As described above, since the small texture is repeatedly applied to represent the object, a size of a texture to be stored may be reduced and a memory may be efficiently used. Also, a variety of small textures may be generated and used based on a characteristic of an object, and thus objects may be variously represented.

In operation S140, the display system may display the 3D texture where the selected texture is applied on a map screen. As described above, the 3D texture may include the 3D linear data of the artificial structure, and the selected texture may be applied to the 3D linear data. Accordingly, an object such as a building may be represented more graphically on the 3D map.

Figure 2:
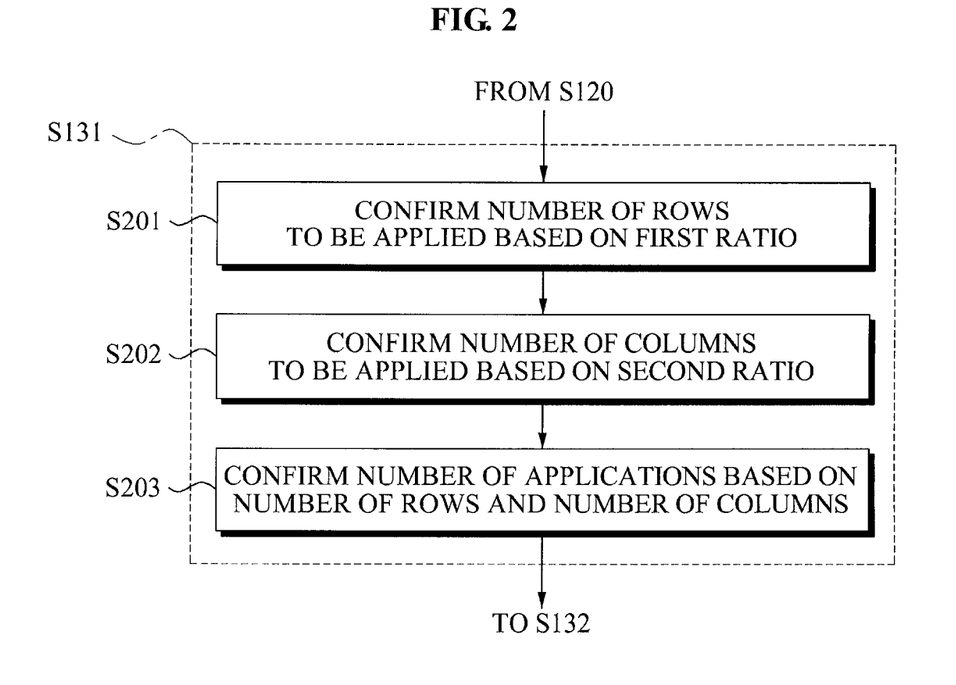
FIG. 2 is a flowchart illustrating an operation of confirming a number of applications according to an embodiment of the present invention.

FIG. 2 is a flowchart illustrating an operation of confirming a number of applications according to an embodiment of the present invention. As shown in FIG. 2, confirming in operations S201 through S203 may be performed in operation S131 of FIG. 1.

Figure 4:
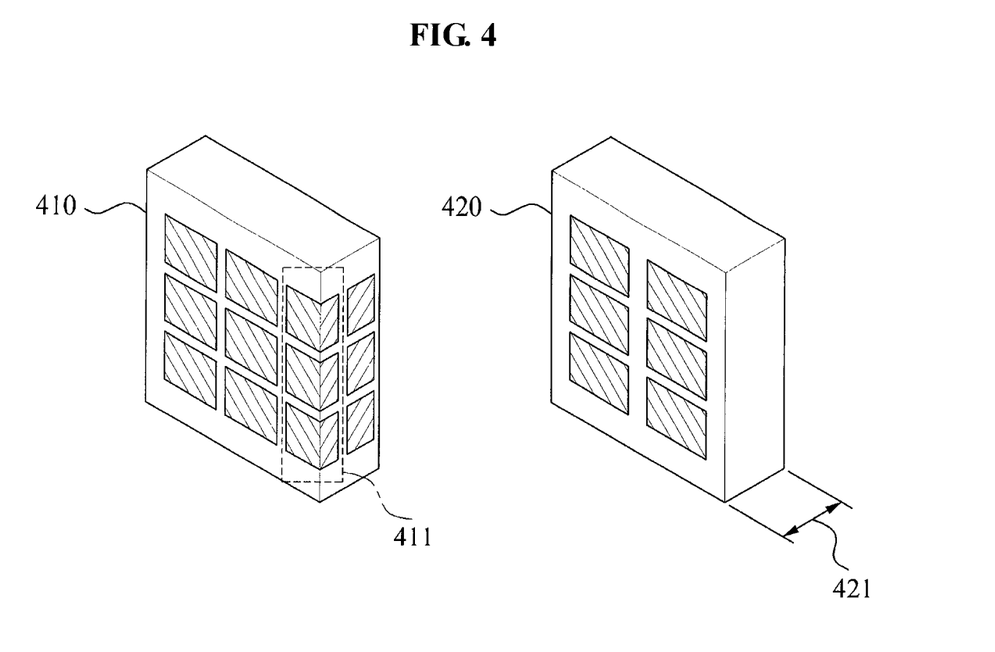
FIG. 4 is a diagram illustrating an example of comparing a texture mapping using texture mapping coordinates in a form of a real number and a texture mapping using texture mapping coordinates in integer form.

In operation S201, the display system may confirm a number of rows to be applied based on a first ratio of a width of the external surface texture to a width of the selected texture. In operation S202, the display system may confirm a number of columns to be applied based on a second ratio of a length of the external surface texture to a length of the selected texture. In this instance, the first ratio and the second ratio may be an integer obtained by truncating decimals. For example, the first ratio and the second ratio may be calculated according to Equation 1 and Equation 2 as given below.

$$U = INT(W/Tx) \qquad \text{[Equation 1]}$$

$$V = INT(H/Ty) \qquad \text{[Equation 2]}$$

where U and V may respectively denote the first ratio and the second ratio, which are texture mapping coordinates. W and H may respectively denote a width and a length of the external surface texture. Tx and Ty may respectively denote a width and a length of the selected texture. Also, INT(n) may denote a function to make 'n' an integer by truncating decimal components of 'n'. The first ratio in integer form may indicate the number of rows, that is, a number of textures to be applied to the width of the external surface texture. The second ratio in integer form may indicate the number of columns, that is, a number of textures to be applied to the length of the external surface texture. In general, a texture may indicate a two-dimensional (2D) image file to be applied to a 3D object. In this instance, texture mapping coordinates may generally have a value in a range of 0 to 1. When a value equal to or greater than 1 is designated, textures may be repeated like tiles. Accordingly, when the texture mapping coordinates in integer form, calculated according to Equation 1 and Equation 2, are used, the selected texture may be repeatedly applied and objects may be represented more graphically. The texture mapping coordinates in integer form are described in detail with reference to FIG. 4.

In operation S203, the display system may confirm the number of applications based on the number of rows and the number of columns. That is, when the external surface corresponds to a rectangle such as a building, the number of applications may be confirmed by multiplying the number of rows and the number of columns. When the external surface is not a rectangle, the external surface may be divided into a plurality of virtual rectangles, and the number of applications for each of the plurality of virtual rectangles may be confirmed. Accordingly, a total number of applications may be confirmed.

Figure 3:
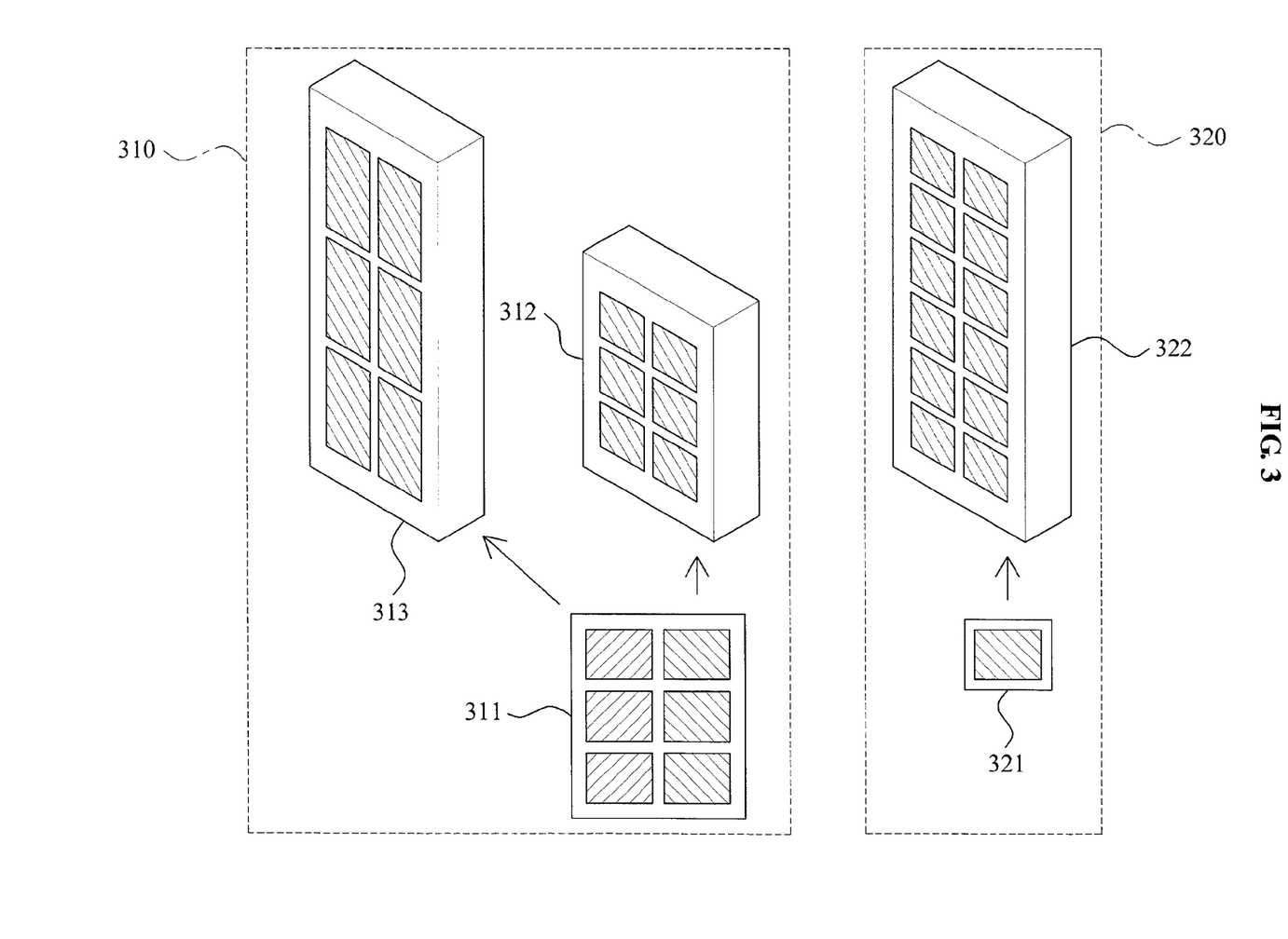
FIG. 3 is a diagram illustrating an example of comparing a texture mapping using a single texture and a texture mapping by repeatedly using a single texture.

FIG. 3 is a diagram illustrating an example of comparing a texture mapping using a single texture and a texture mapping by repeatedly using a single texture.

As an example, it is illustrated that external surfaces of a first building 312 and a second building 313 are represented using a single texture 311 once, in a dotted box 310 of FIG. 3. Here, a size of each of the first building 312 and the second building 313 may be different. In this instance, since sizes of external surfaces may vary depending on a height of an actual building or linear data, the external surfaces may not be graphically represented using the single texture 311. Conversely, as an example, it is illustrated that an external surface of a third building 313 is represented by repeatedly using a small texture 321, in a dotted box 320 of FIG. 3. For example, since a floor-to-floor height of a building is generally similar, a number of floors may increase as a height of the building increases. In this instance, when a single texture is extended, it may be represented that it appears as though both tall buildings and small buildings have the same number of floors. However, when the texture is repeatedly used, a building with a greater number of floors may be represented as the height of the building increases. Accordingly, the building may be represented more graphically. The above-described operation with respect to the height may be applied to a width of the building.

FIG. 4 is a diagram illustrating an example of comparing a texture mapping using texture mapping coordinates in a form of a real number and a texture mapping using texture mapping coordinates in integer form. A fourth building 410 may be an example of texture mapping using texture mapping coordinates in integer form. Since external surfaces may have various sizes, a size of an external surface may not match a size of a texture. Accordingly, when the texture mapping coordinates are in the form of a real number, the texture may fold over as illustrated in a dotted box 411 of FIG. 4. That is, since the texture mapping coordinates in integer form may be generally used, the texture may be repeatedly applied even for decimal amounts that may not correspond to a single surface. Accordingly, an unrealistic surface may be represented as illustrated in the dotted box 411. Conversely, a fifth building 420 may be an example of texture mapping using texture mapping coordinates in integer form. That is, a length 421 shorter than a single texture may be represented as decimals and truncated based on Equation 1 and Equation 2. Accordingly, the texture may not be mapped due to the length 421. In this instance, the length 421 may be represented in a single color, and thus the texture mapping may be performed without errors and an object may be represented more realistically. Also, the truncating may be identically applied to a remaining length of a surface after repeatedly applying the texture. Accordingly, the unrealistic surface illustrated in the dotted box 411 may be overcome.

Figure 5:
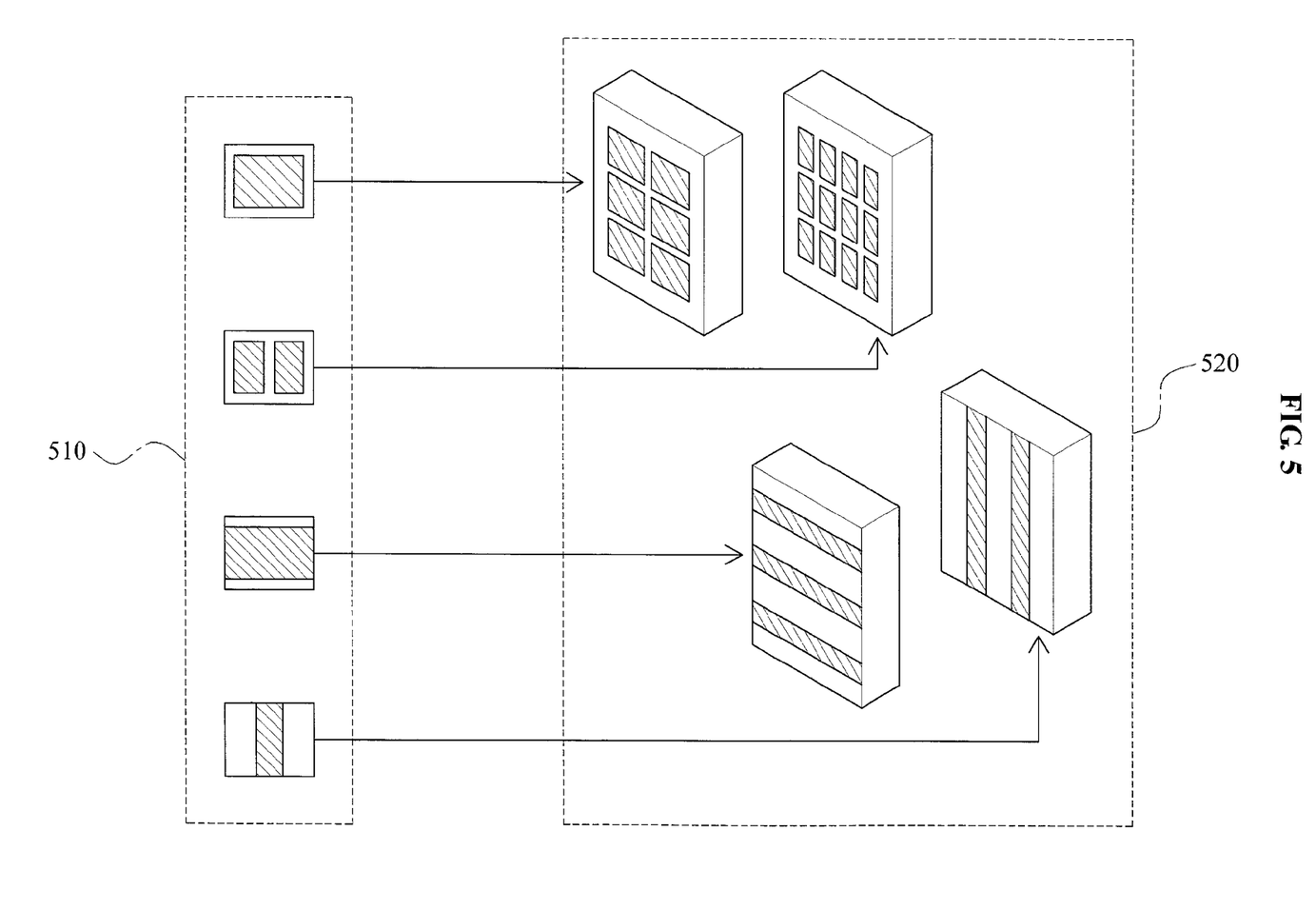
FIG. 5 is a diagram illustrating an example of representing an object variously using a variety of textures.

FIG. 5 is a diagram illustrating an example of representing an object variously using a variety of textures. Here, various textures generated based on a characteristic of an external surface of a building are illustrated in a dotted box 510. Also, examples of external surfaces, represented by mapping the textures, are illustrated in a dotted box 520. As shown in FIG. 5, a small texture may be variously generated and maintained, a memory may be efficiently maintained and objects may be variously represented. Also, a plurality of generated textures may be selected and repeatedly applied depending on a characteristic of a building, or applied using a blending scheme, and thus objects may be represented more realistically.

Figure 6:
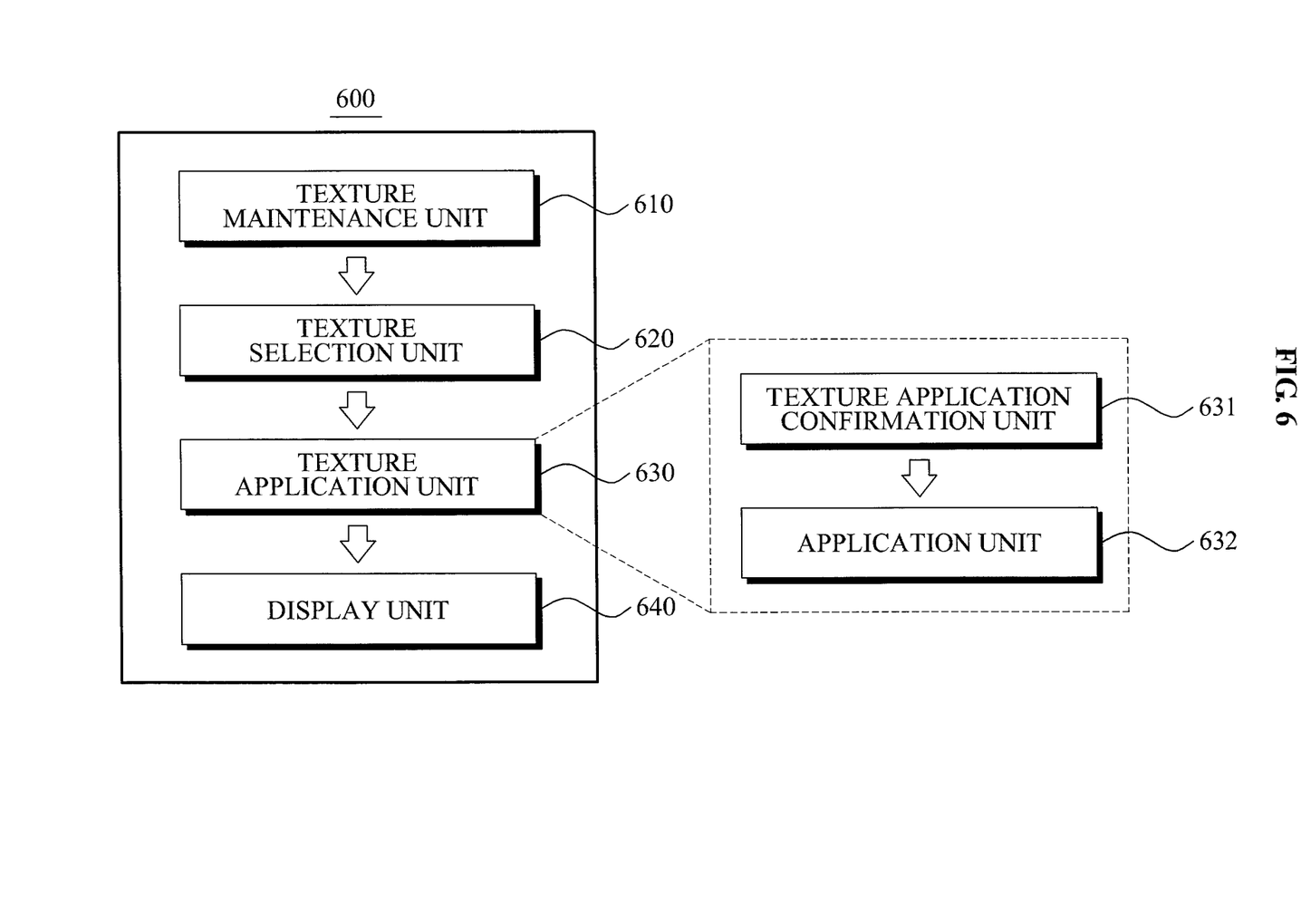
FIG. 6 is a block diagram illustrating a configuration of a display system according to an embodiment of the present invention.

FIG. 6 is a block diagram illustrating a configuration of a display system 600 according to an embodiment of the present invention. The display system 600 may include a texture maintenance unit 610, a texture selection unit 620, a texture application unit 630, and a display unit 640.

The texture maintenance unit 610 may maintain a texture generated based on a characteristic of an object. Here, the object may include an artificial structure to be displayed on a 3D map. The characteristic of the object may include a characteristic of an external surface of the artificial structure such as a building.

The texture selection unit 620 may select a texture based on an object to be displayed. That is, the texture, generated based on the characteristic of the object to be displayed, may be selected in operation S120. In this instance, a plurality of textures as opposed to a single texture may be selected and repeatedly applied, or may be applied using a blending scheme.

The texture application unit 630 may repeatedly apply the selected texture to at least a portion of a 3D texture corresponding to the object to be displayed. Here, the at least a portion of the 3D texture may include an external surface texture with respect to an external surface of the object to be displayed. In this instance, the texture application unit 630 may confirm a number of selected textures to be applied to the external surface texture. For this, the texture application unit 630 may include a texture application confirmation unit 631 and an application unit 632 as illustrated in FIG. 6.

The texture application confirmation unit 631 may confirm a number of applications of the selected texture based on length data of the selected texture and the external surface texture. In this instance, the length data may include data of a width and a length. The number of applications may be confirmed using a number of rows based on the width, and a number of columns based on the length. The texture application confirmation unit 631 is described in greater detail with reference to FIG. 7.

The application unit 632 may connect the same number of the selected texture as the confirmed number of applications, and apply the connected texture to the external surface texture. For example, the 3D texture may include 3D linear data of the artificial structure, and the texture may represent an external appearance of the artificial structure based on the 3D linear data. That is, the number of applications, that is, a number of small textures applied to the 3D linear data of the artificial structure may be confirmed. Also, the application unit 632 may connect the same number of the selected texture as the confirmed number of applications to represent the external appearance of the artificial structure such as a building. For this, the application unit 632 may connect the selected texture in matrix form with the number of rows and the number of columns confirmed by the texture application confirmation unit 631, and apply the connected texture to the external surface texture.

As described above, since the small texture is repeatedly applied to represent the object, a size of a texture to be stored may be reduced and a memory may be efficiently used. Also, a variety of small textures may be generated and used based on a characteristic of an object, and thus the object may be variously represented.

The display unit 640 may display the 3D texture where the selected texture is applied on a map screen. As described above, the 3D texture may include the 3D linear data of the artificial structure, and the selected texture may be applied to the 3D linear data. Accordingly, an object such as a building may be represented more realistically on the 3D map.

Figure 7:
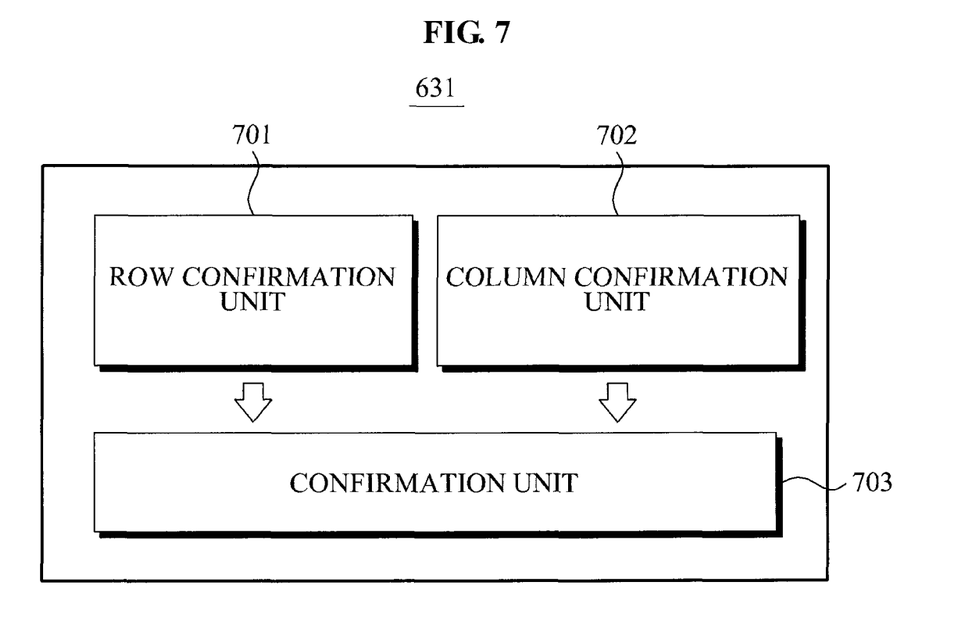
FIG. 7 is a block diagram illustrating a configuration of a texture application confirmation unit according to an embodiment of the present invention.

FIG. 7 is a block diagram illustrating a configuration of a texture application confirmation unit 631 according to an embodiment of the present invention. As shown in FIG. 7, the texture application confirmation unit 631 may include a row confirmation unit 701, a column confirmation unit 702, and a confirmation unit 703.

The row confirmation unit 701 may confirm a number of rows to be applied based on a first ratio of a width of the external surface texture to a width of the selected texture. The column confirmation unit 702 may confirm a number of columns to be applied based on a second ratio of a length of the external surface texture to a length of the selected texture. In this instance, the first ratio and the second ratio may be an integer obtained by truncating decimals. The first ratio and the second ratio in integer form may indicate the number of rows and the number of columns.

The confirmation unit 703 may confirm the number of applications based on the number of rows and the number of columns. That is, when the external surface corresponds to a rectangle such as a building, the number of applications may be confirmed by multiplying the number of rows and the number of columns. When the external surface is not a rectangle, the external surface may be divided into a plurality of virtual rectangles, and the number of applications for each of the plurality of virtual rectangles may be confirmed. Accordingly, a total number of applications may be confirmed.

According to an embodiment of the present invention, the display system and method may display an external appearance of an object such as a building using texture mapping that repeatedly uses a small texture, and thereby may efficiently reduce a texture storage size and display the object. Also, the display system and method may use a small texture generated based on a characteristic of an object, use texture mapping coordinates in integer form, and thereby may represent the object more variously and graphically.

The exemplary embodiments of the present invention include computer-readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A display system, comprising:
   a texture maintenance unit maintaining a texture generated based on a characteristic of an object;
   a texture selection unit selecting a texture based on an object to be displayed; and
   a texture application unit repeatedly applying the selected texture to at least a portion of a three-dimensional (3D) structure corresponding to the object to be displayed in which the portion has a first width and a first length,
   wherein the texture application unit repeatedly applying the selected texture is applying a number of same size textures calculated based on a first ratio, which is an integer obtained by truncating decimals according to the first width of the portion and a second width of the selected texture, and a second ratio, which is an integer obtained by truncating decimals according to the first length of the portion and a second length of the selected texture, each of the repeatedly applied same size textures is fully displayed on an external surface of the portion of the 3D structure.

2. The display system of claim 1, wherein the external surface corresponds to the object to be displayed, and the texture application unit comprises:
   a texture application confirmation unit confirming a number of applications of the selected texture based on width and length data of the selected texture and the external surface texture; and
   an application unit connecting the same number of the selected texture as the confirmed number of applications, and applying the connected texture as repeating same size textures to the external surface texture,
   wherein the texture application confirmation unit confirms the number by processing the length data.

3. The display system of claim 2, wherein the texture application confirmation unit comprises:
   a row confirmation unit confirming a number of rows to be applied based on the first ratio of a width of the external surface texture to the width of the selected texture;
   a column confirmation unit confirming a number of columns to be applied based on the second ratio of a length of the external surface texture to the length of the selected texture; and
   a confirmation unit confirming the number of applications based on the number of rows and the number of columns.

4. The display system of claim 3, wherein the application unit connects the selected texture in matrix form with the number of rows and the number of columns confirmed by the texture application confirmation unit.

5. The display system of claim 1, wherein an unapplied portion of the external surface texture is in a predetermined color.

6. The display system of claim 1, further comprising:
   a display unit displaying the 3D texture where the selected texture is applied on a map screen.

7. The display system of claim 1, wherein the object includes an artificial structure to be displayed on a 3D map, and the characteristic of the object includes a characteristic of an external surface of the artificial structure.

8. The display system of claim 7, wherein the selected texture includes 3D linear data of the artificial structure, and the repeatedly applied same size textures represents an external appearance of the artificial structure based on the 3D linear data.

9. A display method, comprising:
maintaining, by a display system, a texture generated based on a characteristic of an object;
selecting, by the display system, a texture based on an object to be displayed; and
repeatedly applying, by the display system, the selected structure to at least a portion of a 3D object to be displayed in which the portion has a first width and a first length,
wherein the repeatedly applying the selected texture is applying a number of same size textures calculated based on a first ratio, which is an integer obtained by truncating decimals according to the first width of the portion and a second width of the selected texture, and a second ratio, which is an integer obtained by truncating decimals according to the first length of the portion and a second length of the selected texture, each of the repeatedly applied same size textures is fully displayed on an external surface of the portion of the 3D structure.

10. The display method of claim 9, wherein the external surface corresponds to the object to be displayed, and the applying comprises:
confirming a number of applications of the selected texture based on width and length data of the selected texture and the external surface texture; and
connecting the same number of the selected texture as the confirmed number of applications, and applying the connected texture as repeating same size textures to the external surface texture.

11. The display method of claim 10, wherein the confirming comprises:
confirming a number of rows to be applied based on the first ratio of a width of the external surface texture to the width of the selected texture;
confirming a number of columns to be applied based on the second ratio of a length of the external surface texture to the length of the selected texture; and
confirming the number of applications based on the number of rows and the number of columns.

12. The display method of claim 11, wherein the connecting and the applying comprises:
connecting the selected texture in matrix form with the number of rows and the number of columns.

13. The display method of claim 9, further comprising:
displaying the selected texture as repeating same size textures on a map screen.

14. The display method of claim 9, wherein the object includes an artificial structure to be displayed on a 3D map, and the characteristic of the object includes a characteristic of an external surface of the artificial structure.

15. The display method of claim 14, wherein the selected texture includes 3D linear data of the artificial structure, and the repeatedly applied same size textures represent an external appearance of the artificial structure based on the 3D linear data.

16. A non-transitory computer-readable storage medium storing a program for implementing the method according to claim 9.

* * * * *